(12) United States Patent
Nishimoto (10) Patent No.: US 11,867,992 B2
(45) Date of Patent: *Jan. 9, 2024

(54) DISPLAY DEVICE

(71) Applicant: Japan Display Inc., Tokyo (JP)

(72) Inventor: Takuya Nishimoto, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/992,455

(22) Filed: Nov. 22, 2022

(65) Prior Publication Data

US 2023/0084709 A1 Mar. 16, 2023

Related U.S. Application Data

(63) Continuation of application No. 17/404,112, filed on Aug. 17, 2021, now Pat. No. 11,543,691.

(30) Foreign Application Priority Data

Aug. 25, 2020 (JP) .................. 2020-141638

(51) Int. Cl.
*G02F 1/1333* (2006.01)

(52) U.S. Cl.
CPC .... *G02F 1/13332* (2021.01); *G02F 1/133317* (2021.01); *G02F 1/133391* (2021.01)

(58) Field of Classification Search
None
See application file for complete search history.

(56) References Cited

U.S. PATENT DOCUMENTS

| 11,543,691 B2 * | 1/2023 | Nishimoto ........ G02F 1/133391 |
| 2014/0232969 A1 | 8/2014 | Tsubaki et al. |
| 2018/0173036 A1 | 6/2018 | Kim et al. |

FOREIGN PATENT DOCUMENTS

| JP | 2014-160218 A | 9/2014 |
| WO | WO2013/151216 A1 | 10/2013 |

* cited by examiner

*Primary Examiner* — Richard H Kim
(74) *Attorney, Agent, or Firm* — K&L Gates LLP (57) ABSTRACT

According to an aspect, a display device includes: a front surface panel; a plurality of display units disposed at different positions on a back of the front surface panel; and a main frame supporting side parts of a first display unit and a second display unit adjacent to each other among the plurality of display units, and fixed to a back surface of the front surface panel.

10 Claims, 9 Drawing Sheets

DISPLAY DEVICE

CROSS-REFERENCE TO RELATED APPLICATIONS

This application is a continuation of U.S. application Ser. No. 17/404,112, filed on Aug. 17, 2021, which application claims the benefit of priority from Japanese Patent Application No. 2020-141638, filed on Aug. 25, 2020, the entire contents of which are incorporated herein by reference.

BACKGROUND

1. Technical Field

What is disclosed herein relates to a display device.

2. Description of the Related Art

There is a transmissive display device including a backlight disposed on the back of a front surface panel and configured to display an image in a display region of the front surface panel by using light from the backlight (refer to Japanese Patent Application Laid-open Publication No. 2014-160218 (JP-A-2014-160218)). In JP-A-2014-160218, the front surface panel has the one display region and is supported by a frame.

A display device including a plurality of display regions on a front surface panel supported by a frame has been desired.

For the foregoing reasons, there is a need for a display device including a plurality of display regions on a front surface panel supported by a frame.

SUMMARY

According to an aspect, a display device includes: a front surface panel; a plurality of display units disposed at different positions on a back of the front surface panel; and a main frame supporting side parts of a first display unit and a second display unit adjacent to each other among the plurality of display units, and fixed to a back surface of the front surface panel.

According to an aspect, a display device includes: a front surface panel; a plurality of display units disposed on a back of the front surface panel and disposed at different positions; a first frame fixed to the back surface of the front surface panel and supporting a side part of a first display unit among the plurality of display units; and a second frame fixed to the back surface of the front surface panel, supporting a side part of a second display unit adjacent to the first display unit, and provided separately from the first frame.

DETAILED DESCRIPTION

Aspects (embodiments) of the present disclosure will be described below in detail with reference to the accompanying drawings. Contents described below in the embodiments do not limit the present disclosure. Components described below include those that could be easily conceived by the skilled person in the art and those identical in effect. Components described below may be combined as appropriate.

The disclosure is merely exemplary, and any modification that could be easily conceived by the skilled person in the art as appropriate without departing from the gist of the disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases.

First Embodiment

Figure 1:
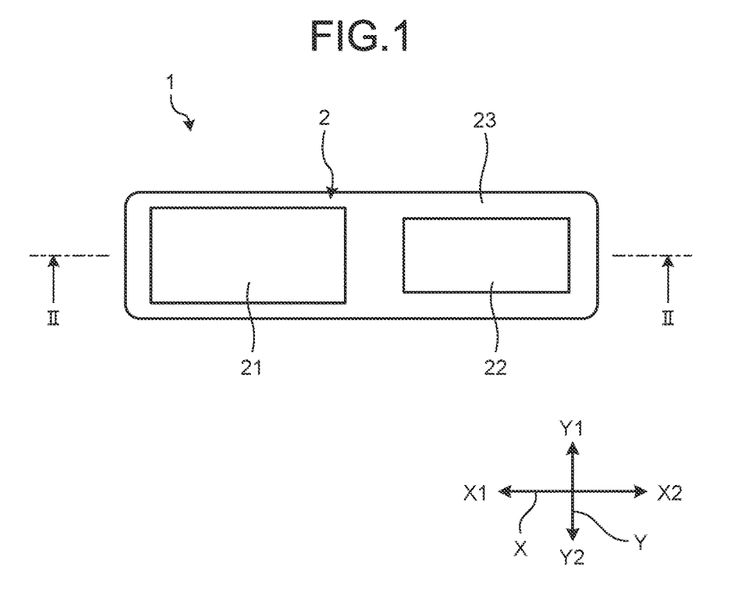
FIG. 1 is a front view of a display device according to a first embodiment.
Figure 2:
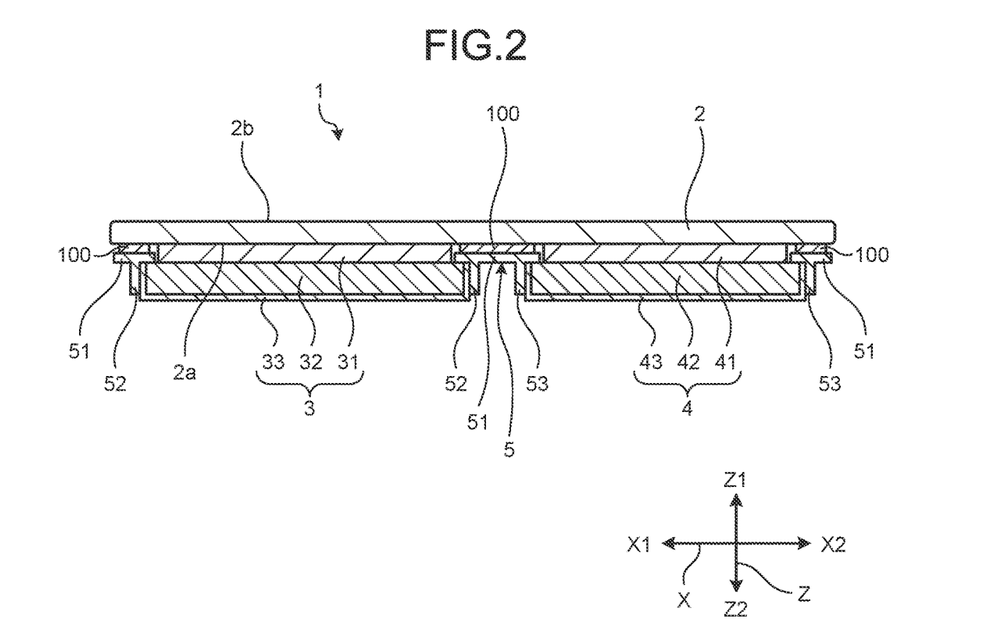
FIG. 2 is a cross-sectional view taken along line II-II in FIG. 1.

FIG. 1 is a front view of a display device according to a first embodiment. FIG. 2 is a cross-sectional view taken along line II-II in FIG. 1.

As illustrated in FIG. 1, a display device 1 according to the first embodiment is, for example, an in-car display device such as a car navigation system and has a horizontally long rectangular shape in which two light transmitting parts 21 and 22 are arranged in a right-left direction (X direction). Specifically, a cover glass (front surface panel) 2 is provided on a front surface of the display device 1. The light transmitting part 21 having a rectangular shape is provided on an X1 side of the cover glass 2, the light transmitting part 22 having a rectangular shape is provided on an X2 side thereof, and a light blocking part 23 is provided around the light transmitting parts 21 and 22. The light transmitting parts 21 and 22 are display regions of the display device 1, and the light blocking part 23 is a frame region of the display device 1. In the present disclosure, the number of light transmitting parts (display regions) is two or more but not limited to two and may be three or more.

As illustrated in FIG. 2, the display device 1 includes the cover glass (front surface panel) 2, a first display unit (display unit) 3, a second display unit (display unit) 4, and a main frame 5. The display units (the first display unit 3 and the second display unit 4) are disposed on the back (Z2 side) of the cover glass 2 at different positions with an interval therebetween in the X direction. In the present embodiment, the first display unit 3 and the second display unit 4 are provided. The first display unit 3 and the second display unit 4 are adjacent to each other in the X direction. The first display unit 3 includes a liquid crystal display panel (LCD panel; also referred to as liquid crystal panel) 31 as an exemplary display panel, a backlight 32, a housing case 33, and a first coupling member 34 (refer to FIG. 3). The second display unit 4 includes a LCD panel 41 as an exemplary display panel, a backlight 42, a housing case 43, and a second coupling member 44 (refer to FIG. 4).

As illustrated in FIG. 2, the cover glass (front surface panel) 2 is disposed closest to a Z1 side in the display device 1. The cover glass 2 is a transparent glass member covering and protecting display surfaces of the LCD panels 31 and 41 disposed on a back surface 2a side (Z2 side). As described above with reference to FIG. 1, the cover glass 2 is provided with the light blocking part 23. The light blocking part 23 is a region blocking light from the LCD panels 31 and 41. The light blocking part 23 is formed by printing a light blocking member onto the cover glass 2 through performing screen-printing or the like. The light blocking member may be provided on any of a front surface 2b and the back surface 2a of the cover glass 2.

The first display unit 3 will be described below. In the LCD panel (display panel) 31 illustrated in FIG. 2, a liquid crystal layer is disposed between two transparent substrates (refer to FIG. 6). The LCD panel 31 of the present embodiment is, for example, a liquid crystal display of a fringe field switching (FFS) type. A drive electrode (common electrode) and pixel electrodes formed for respective pixels in a matrix having a row-column configuration are stacked on one of the transparent substrates. At least one of the two transparent substrates is provided with a color filter including filters of R (red), G (green), B (blue), and the like arranged for the respective pixels. The LCD panel 31 has an opening formed at the pixel electrodes or the drive electrode (common electrode), and electric field (fringe electric field) leaking from the opening drives liquid crystals. The LCD panel 31 displays an image by switching between transmission and blocking of light at each pixel based on an image signal. The LCD panel 31 is not limited to the FFS type but may be a liquid crystal display of an in-plane switching (IPS) type, a twisted nematic (TN) type, an optically compensated bend (OCB; also referred to as optically compensated birefringence) type, or an electrically controlled birefringence (ECB) type.

The backlight 32 is disposed on the back surface side (Z2 side) of the LCD panel 31. In other words, the backlight 32 is disposed opposite to the LCD panel 31 in a Z direction. The backlight 32 includes a light source (not illustrated) configured to output light and irradiates the LCD panel 31 with the light.

The housing case 33 is a box-shaped case made of resin or metal. The housing case 33 houses the backlight 32 and blocks light irradiated from the backlight 32 to prevent external leakage. The housing case 33 is preferably made of metal to obtain a heat releasing characteristic and the like. The first coupling member 34 will be described later in detail.

The main frame 5 includes a plate part 51 and leg parts 52 and 53 and is made of, for example, resin. The plate part 51 and the leg parts 52 and 53 are integrated. The plate part 51 extends along the back surface 2a of the cover glass 2. The plate part 51 is fixed to the back surface 2a of the cover glass 2 with a double-sided adhesive tape 100. The leg part 52 extends annularly along the side of the backlight 32. The leg part 52 supports a side part of the first display unit 3. The leg part 53 supports a side part of the second display unit 4 to be described later.

The second display unit 4 will be described below. In the LCD panel (display panel) 41 illustrated in FIG. 2, a liquid crystal layer is disposed between two transparent substrates (refer to FIG. 6). The structure and material of the LCD panel 41 of the present embodiment are the same as those of the LCD panel 31.

The backlight 42 is disposed on the back surface side (Z2 side) of the LCD panel 41. In other words, the backlight 42 is disposed opposite to the LCD panel 41 in the Z direction. The backlight 42 includes a light source (not illustrated) configured to output light and irradiates the LCD panel 41 with the light. The light source may be a light emitting diode (LED) or a fluorescence lamp.

The housing case 43 is a box-shaped case made of resin or metal. The housing case 43 houses the backlight 42 and blocks light irradiated from the backlight 42 to prevent external leakage. The housing case 43 is preferably made of metal to obtain a heat releasing characteristic and the like. The second coupling member 44 will be described later in detail.

Figure 3:
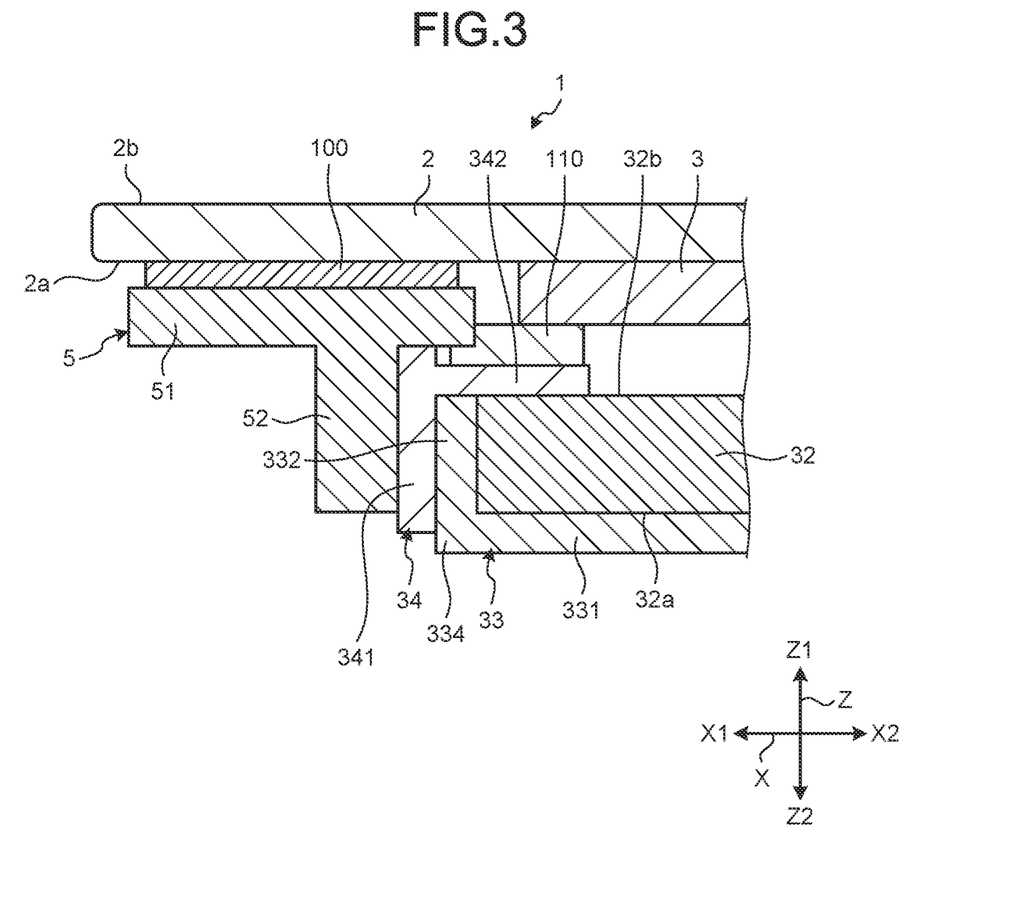
FIG. 3 is an enlarged cross-sectional view of an end part on an X1 side in FIG. 2.
Figure 4:
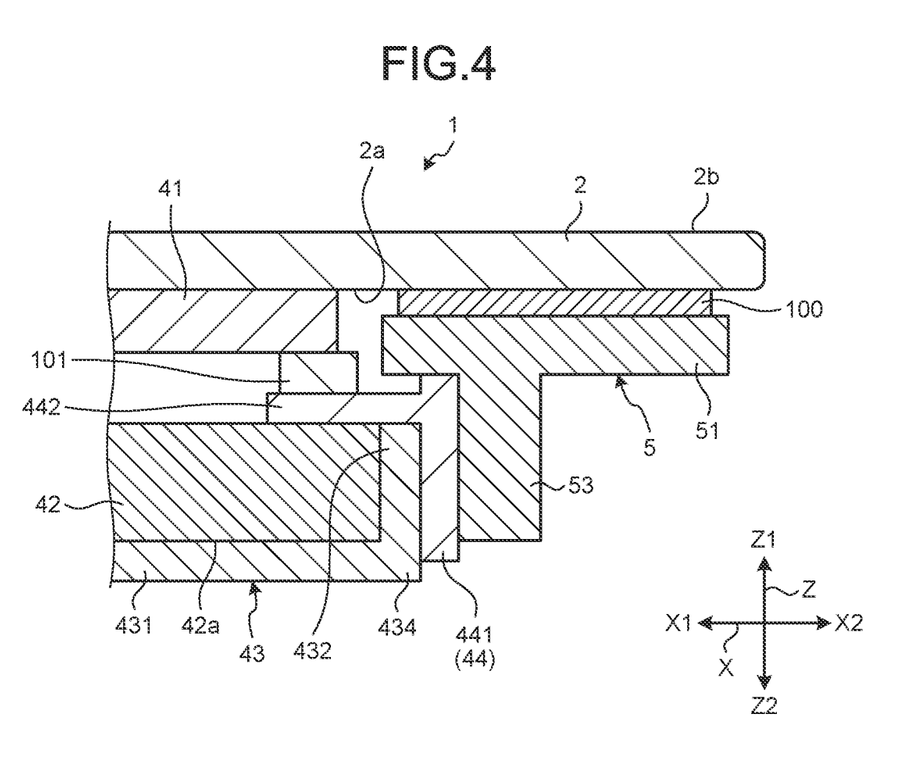
FIG. 4 is an enlarged cross-sectional view of an end part on an X2 side in FIG. 2.
Figure 5:
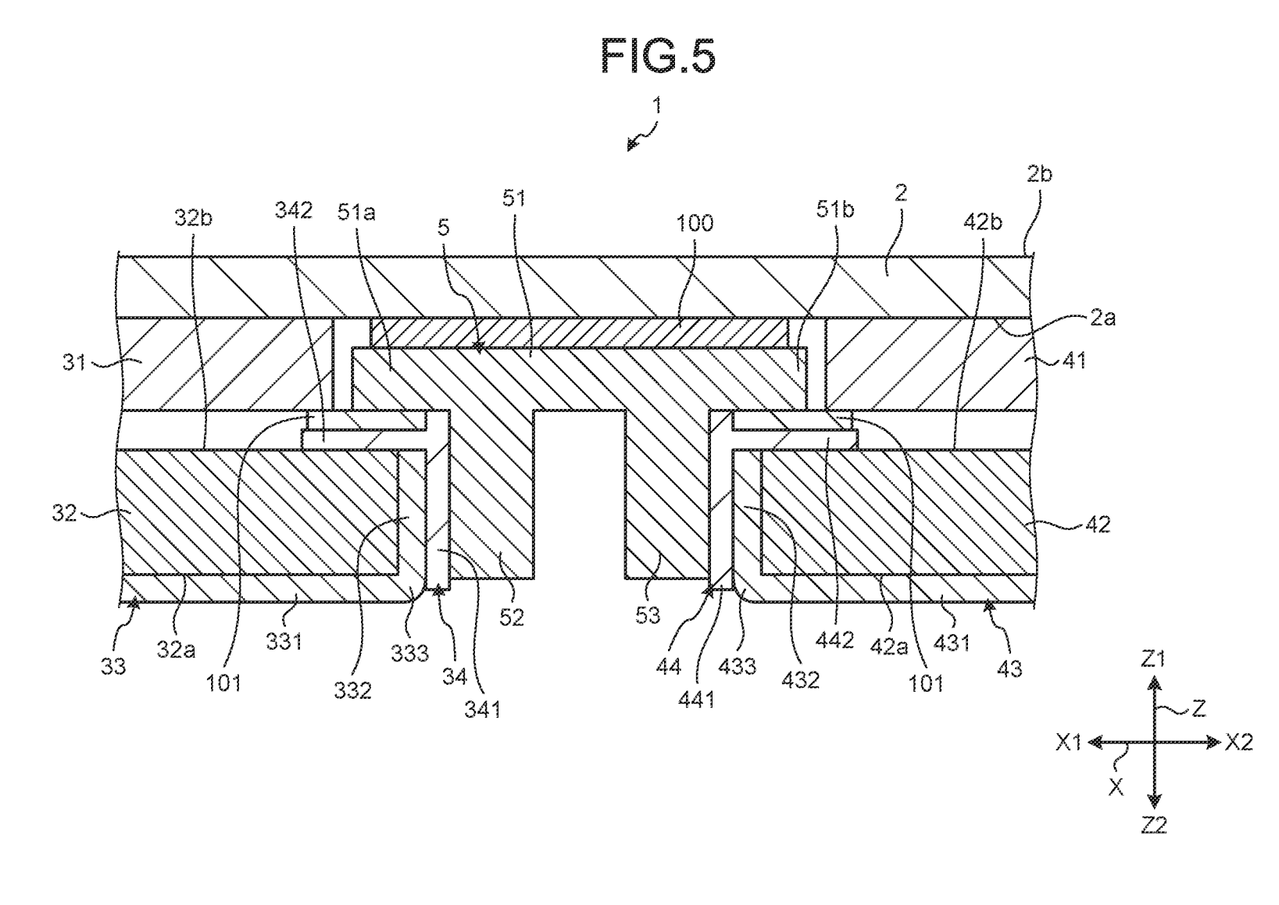
FIG. 5 is an enlarged cross-sectional view of a central part in an X direction in FIG. 2.
Figure 6:
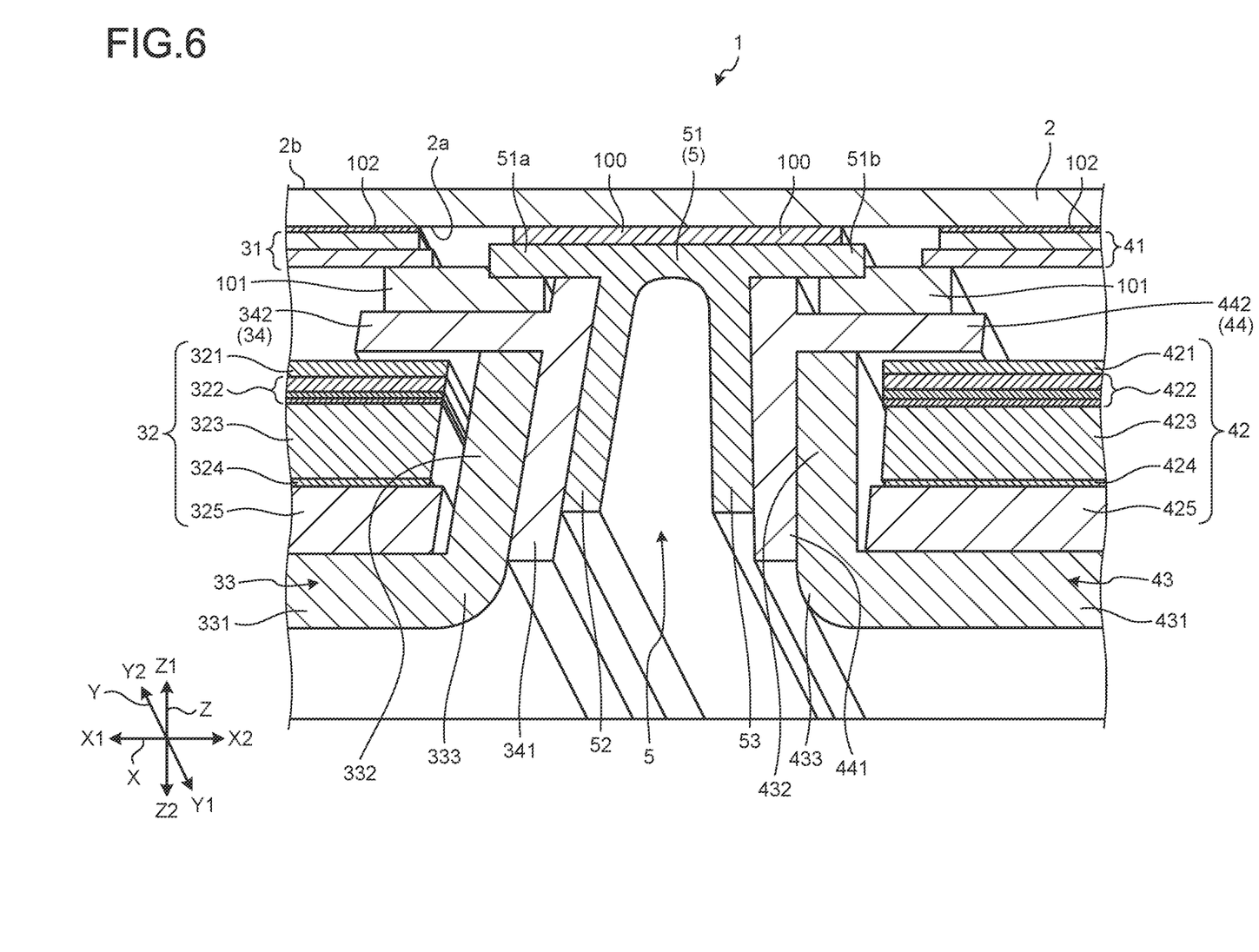
FIG. 6 is an oblique view of the cross-sectional view in FIG. 5.

The configuration of the display device 1 will be further specifically described with reference to FIGS. 3 to 6. FIG. 3 is an enlarged cross-sectional view of an end part on the X1 side in FIG. 2. FIG. 4 is an enlarged cross-sectional view of an end part on the X2 side in FIG. 2. FIG. 5 is an enlarged cross-sectional view of a central part in the X direction in FIG. 2. FIG. 6 is an oblique view of the cross-sectional view in FIG. 5.

As illustrated in FIG. 6, the backlight 32 included in the first display unit 3 includes optical sheets 321 and 322, a light guiding plate 323, a reflection sheet 324, and a heat releasing plate 325.

As illustrated in FIG. 6, the optical sheet 322 is stacked on the back (Z2 side) of the optical sheet 321, and the light guiding plate 323 is stacked on the back (Z2 side) of the optical sheet 322. The reflection sheet 324 is stacked on the back (Z2 side) of the light guiding plate 323, and the heat releasing plate 325 is stacked on the back (Z2 side) of the reflection sheet 324. The optical sheet 322 is, for example, a prism sheet and increases the directionality of light radiated from the front surface of the light guiding plate 323. The optical sheets 321 and 322 are a plurality of optical sheets included in the backlight and may be, for example, diffusive sheets, or polarization sheets. The optical sheets 321 and 322 may each have a single-layer structure or a multilayered structure. The reflection sheet 324 moderately diffuses light having the increased directionality. The reflection sheet 324 reflects light leaking from the light guiding plate 323, and thus the reflected light is incident onto the light guiding plate 323. The reflection sheet 324 is made of, for example, foamed polyethylene terephthalate (PET). The reflection sheet 324 may be, for example, a silver evaporation coating film, a multilayered reflection film, or a white PET. The reflection sheet 324 and the optical sheets 321 and 322 are provided as necessary and may be omitted. The heat releasing plate 325 may be made of, for example, aluminum or an aluminum alloy to obtain an increased heat releasing characteristic. The heat releasing plate 325 is provided as necessary and may be omitted. The heat releasing plate 325 may be integrally formed with the housing case 33. The LCD panel 31 is fixed to the back surface 2a of the cover glass 2 with a bonding layer 102.

As illustrated in FIGS. 3 and 5, the housing case 33 includes a bottom plate part 331 and a side plate part 332. The bottom plate part 331 is a flat plate member in the present embodiment. The bottom plate part 331 supports a back surface 32a of the backlight 32. The side plate part 332 extends from edges 333 and 334 of the bottom plate part 331 toward the front side (Z1 side). The edge 333 is positioned on the X2 side of the edge 334.

As illustrated in FIGS. 3 and 5, the first coupling member 34 includes a side plate part 341 and a front plate part (fifth plate part) 342. The side plate part 341 extends in the Z direction. The side plate part 341 is adjacent to and outside the side plate part 332 of the housing case 33 in the X direction. In other words, the side plate part 341 is formed in an annular shape surrounding the side plate part 332 on its inner periphery side. The front plate part 342 extends along the cover glass 2 to a position overlapping the backlight 32 in the Z direction. The front plate part 342 is in contact with a front surface 32b of the backlight 32. A gap (air layer) may be provided between the front plate part 342 and the front surface 32b of the backlight 32.

Thus, the backlight 32 is sandwiched between the front plate part 342 and the bottom plate part 331 in the Z direction. A protrusion (not illustrated) is provided at the side plate part 341 of the first coupling member 34 illustrated in FIG. 3, and a through-hole (not illustrated) is provided at the leg part 52 of the main frame 5. The protrusion of the side plate part 341 fits into the through-hole of the leg part 52, and thus the leg part 52 of the main frame 5 supports the side part of the first display unit 3. In addition, another through-hole is provided at the side plate part 341 of the first coupling member 34 illustrated in FIG. 3, and another protrusion (not illustrated) is provided at the side plate part 332 of the housing case 33. The protrusion of the side plate part 332 fits into the through-hole of the side plate part 341, and thus the first coupling member 34 supports a side part of the housing case 33. In this manner, the main frame 5, the first coupling member 34, and the housing case 33 are integrally fixed to each other.

As illustrated in FIG. 5, the main frame 5 has a cross-sectional shape of coupled two "T" figures at the central part in the X direction in FIG. 2. The leg parts 52 and 53 of the main frame 5 are adjacent to each other in the X direction. The leg parts 52 and 53 extend from the back surface of the plate part 51 toward the Z2 side. The leg part 52 is positioned on the X1 side of the leg part 53. An end part 51a of the plate part 51 on the X1 side is disposed to overlap the front plate part 342 of the first coupling member 34 when viewed in the Z direction. An elastic buffer material 101 is disposed between the end part 51a and the front surface 32b of the backlight 32. In other words, the buffer material 101 is provided on the front side (Z1 side) of the front plate part 342, and the LCD panel 31 and the end part 51a of the plate part 51 are provided on the front side (Z1 side) of the buffer material 101.

The second display unit 4 will be described below. As illustrated in FIG. 6, the backlight 42 included in the second display unit 4 includes optical sheets 421 and 422, a light guiding plate 423, a reflection sheet 424, and a heat releasing plate 425.

As illustrated in FIG. 6, the optical sheet 422 is stacked on the back (the Z2 side) of the optical sheet 421, and the light guiding plate 423 is stacked on the back (the Z2 side) of the optical sheet 422. The reflection sheet 424 is stacked on the back (the Z2 side) of the light guiding plate 423, and the heat releasing plate 425 is stacked on the back (the Z2 side) of the reflection sheet 424. The optical sheet 422 is, for example, a prism sheet and increases the directionality of light radiated from the front surface of the light guiding plate 423. The optical sheets 421 and 422 are a plurality of optical sheets included in the backlight and may be, for example, diffusive sheets, or polarization sheets. The optical sheets 421 and 422 may each have a single-layer structure or may have a multilayered structure together.

The reflection sheet 424 moderately diffuses light having the increased directionality. The reflection sheet 424 reflects light leaking from the light guiding plate 423, and thus the reflected light is incident onto the light guiding plate 423. The reflection sheet 424 is made of, for example, foamed polyethylene terephthalate (PET). The reflection sheet 424 may be, for example, a silver evaporation coating film, a multilayered reflection film, or a white PET. The reflection sheet 424 and the optical sheets 421 and 422 are provided as necessary and may be omitted. The heat releasing plate 425 may be made of, for example, aluminum or an aluminum alloy to obtain an increased heat releasing characteristic. The heat releasing plate 425 is provided as necessary and may be omitted. The heat releasing plate 425 may be integrally formed with the housing case 43. The LCD panel 41 is fixed to the back surface 2a of the cover glass 2 with the bonding layer 102.

As illustrated in FIGS. 4 and 5, the housing case 43 includes a bottom plate part 431 and a side plate part 432. The bottom plate part 431 is a flat plate member in the present embodiment. The bottom plate part 431 supports a back surface 42a of the backlight 42. The side plate part 432 extends from edges 433 and 434 of the bottom plate part 431 toward the front side (Z1 side). The edge 433 is positioned on the X1 side of the edge 434.

As illustrated in FIGS. 4 and 5, the second coupling member 44 includes a side plate part 441 and a front plate part (sixth plate part) 442. The side plate part 441 extends in the Z direction. The side plate part 441 is adjacent to and outside the side plate part 432 of the housing case 43 in the X direction. In other words, the side plate part 441 is formed in an annular shape surrounding the side plate part 432 on its inner periphery side. The front plate part 442 extends along the cover glass 2 to a position overlapping the backlight 42 in the Z direction. The front plate part 442 is in contact with a front surface 42b of the backlight 42. A gap (air layer) may be provided between the front plate part 442 and the front surface 42b of the backlight 42.

Thus, the backlight 42 is sandwiched between the front plate part 442 and the bottom plate part 431 in the Z direction. A protrusion (not illustrated) is provided at the side plate part 441 of the second coupling member 44 illustrated in FIG. 4, and a through-hole (not illustrated) is provided at the leg part 53 of the main frame 5. The protrusion of the side plate part 441 fits into the through-hole of the leg part 53, and thus the leg part 53 of the main frame 5 supports the side part of the second display unit 4. In addition, another through-hole is provided at the side plate part 441 of the second coupling member 44 illustrated in FIG. 4, and another protrusion (not illustrated) is provided at the side plate part 432 of the housing case 43. The protrusion of the side plate part 432 fits into the through-hole of the side plate part 441, and thus the second coupling member 44 supports a side part of the housing case 43. In this manner, the main frame 5, the second coupling member 44, and the housing case 43 are integrally fixed to each other.

As illustrated in FIG. 5, an end part 51b of the plate part 51 on the X2 side is disposed to overlap the front plate part 442 of the second coupling member 44 when viewed in the Z direction. The elastic buffer material 101 is disposed between the end part 51b and the front surface 42b of the backlight 42. In other words, the buffer material 101 is provided on the front side (Z1 side) of the front plate part 442, and the LCD panel 31 and the end part 51b of the plate part 51 are provided on the front side (Z1 side) of the buffer material 101.

The display device 1 according to the first embodiment described above includes the cover glass (front surface panel) 2, the plurality of display units disposed at different positions on the back of the cover glass 2, and the main frame 5 supporting the side part of the first display unit 3 and the side part of the second display unit 4 and fixed to the back surface 2a of the cover glass 2. Thus, the display device 1 can be provided with a plurality (in the present embodiment, two) of display regions of the cover glass (front surface panel) 2 supported by the main frame 5. In other words, in a display device according to JP-A-2014-160218 described above, a cover glass is supported by a frame but includes only one display region. However, in the present embodiment, the display device 1 including a plurality of display regions is provided.

The first display unit 3 includes the LCD panel (display panel) 31 fixed to the back surface 2a of the cover glass 2, the backlight 32 disposed on the back of the LCD panel 31 and configured to illuminate the LCD panel 31, the housing case 33 housing therein the backlight 32, and the first coupling member 34 coupling the housing case 33 and the main frame 5 to each other. In this manner, the housing case 33 housing therein the backlight 32 is coupled to the main frame 5 by the first coupling member 34. The main frame 5 is fixed to the cover glass 2. Therefore, the backlight 32, the housing case 33, the first coupling member 34, and the cover glass 2 are united by the main frame 5.

The second display unit 4 includes the LCD panel (display panel) 41 fixed to the back surface 2a of the cover glass 2, the backlight 42 disposed on the back of the LCD panel 41 and configured to illuminate the LCD panel 41, the housing case 43 housing therein the backlight 42, and the second coupling member 44 coupling the housing case 43 and the main frame 5 to each other. In this manner, the housing case 43 housing therein the backlight 42 is coupled to the main frame 5 by the second coupling member 44. The main frame 5 is fixed to the cover glass 2. Therefore, the backlight 42, the housing case 43, the second coupling member 44, and the cover glass 2 are united by the main frame 5.

In addition to the backlight 32, the housing case 33, the first coupling member 34, and the cover glass 2 described above, the backlight 42, the housing case 43, the second coupling member 44, and the cover glass 2 are united by the main frame 5. Since the components of the entire display device 1 are united by the main frame 5 in this manner, the display device 1 can be compactly assembled with a simple configuration.

The first coupling member 34 includes the front plate part (fifth plate part) 342 extending along the cover glass 2 to a position overlapping the backlight 32, and the backlight 32 is sandwiched between the front plate part 342 and the housing case 33. Thus, the backlight 32 can housed in the housing case 33 with a simple configuration.

The second coupling member 44 includes the front plate part (sixth plate part) 442 extending along the cover glass 2 to a position overlapping the backlight 42, and the backlight 42 is sandwiched between the front plate part 442 and the housing case 43. Thus, the backlight 42 can be housed in the housing case 43 with a simple configuration.

Second Embodiment

A display device 1A according to a second embodiment will be described below. Any portion having the same configuration as that of the display device 1 according to the first embodiment described above is denoted by the same reference sign and description thereof is omitted. Specifically, a frame of the display device 1A of the second embodiment is different from that of the display device 1 of the first embodiment and thus will be described below in detail.

Figure 7:
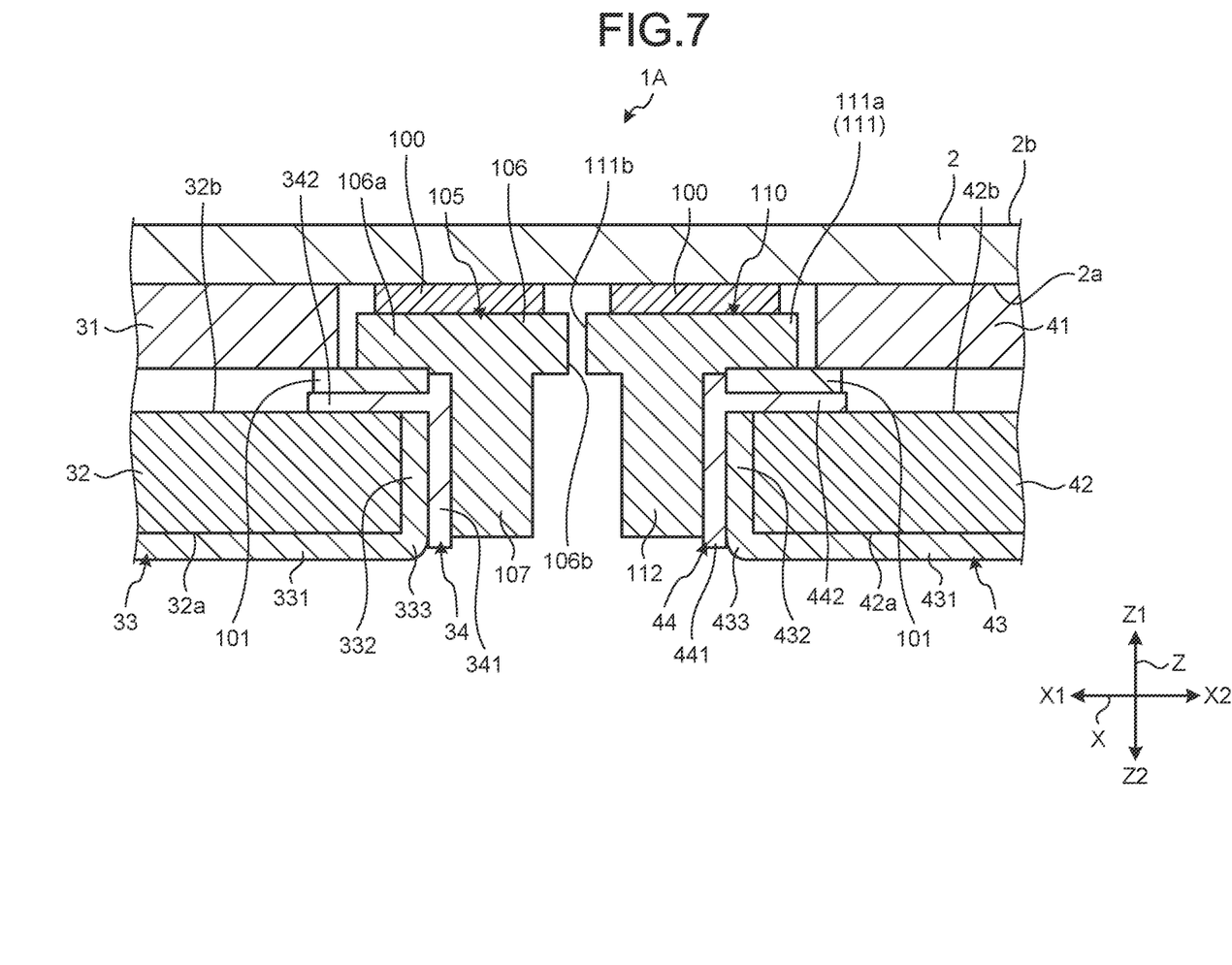
FIG. 7 is a cross-sectional view of a display device according to a second embodiment and is a diagram corresponding to FIG. 5 according to the first embodiment.
Figure 8:
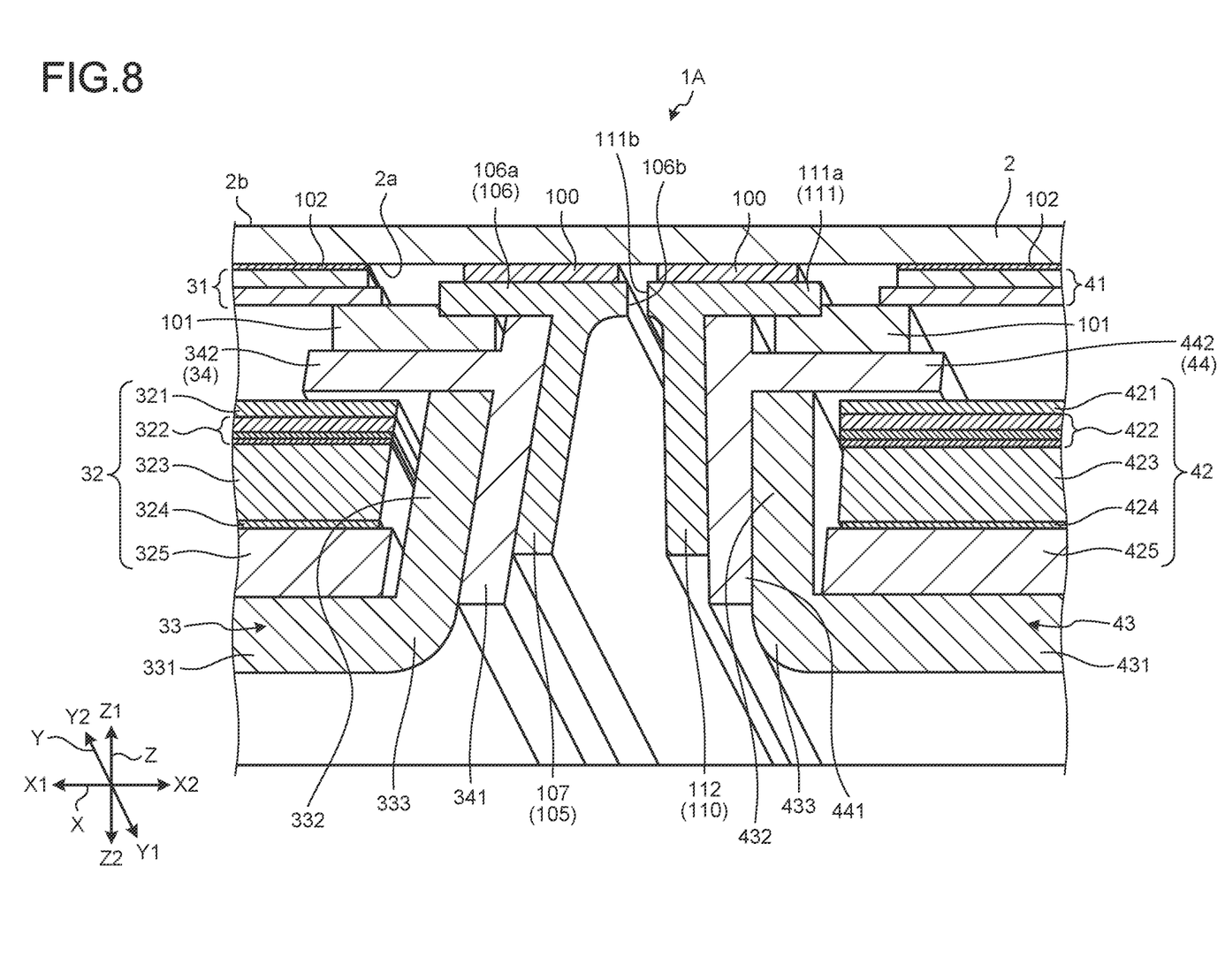
FIG. 8 is an oblique view of the cross-sectional view in FIG. 7.

FIG. 7 is a cross-sectional view of the display device according to the second embodiment and is a diagram corresponding to FIG. 5 according to the first embodiment. FIG. 8 is an oblique view of the cross-sectional view in FIG. 7.

As illustrated in FIGS. 7 and 8, the display device 1A according to the second embodiment includes a first frame 105 and a second frame 110.

The first frame 105 has a T-shaped cross section. Specifically, the first frame 105 includes a plate part 106 and a leg part 107. The plate part 106 and the leg part 107 are integrated and made of, for example, resin. The plate part 106 extends along the back surface 2a of the cover glass 2. The plate part 106 is fixed to the back surface 2a of the cover glass 2 by the double-sided adhesive tape 100.

An end part 106a of the plate part 106 on the X1 side is disposed to overlap the front plate part 342 of the first coupling member 34 when viewed in the Z direction. The elastic buffer material 101 is disposed between the end part 106a and the front surface 32b of the backlight 32. In other words, the buffer material 101 is provided on the front side (Z1 side) of the front plate part 342, and the LCD panel 31 and the end part 106a of the plate part 106 are provided on the front side (Z1 side) of the buffer material 101.

The leg part 107 extends annularly along the side of the backlight 32. The leg part 107 extends from the back surface of the plate part 106 to the Z2 side and supports the side part of the first display unit 3. Specifically, a protrusion (not illustrated) is provided at the side plate part 341 of the first coupling member 34 illustrated in FIGS. 7 and 8, and a through-hole (not illustrated) is provided at the leg part 107 of the first frame 105. The protrusion of the side plate part 341 fits into the through-hole of the leg part 107, and thus the leg part 107 of the first frame 105 supports the side part of the first display unit 3. In addition, another through-hole is provided at the side plate part 341 of the first coupling member 34 illustrated in FIGS. 7 and 8, and another protrusion (not illustrated) is provided at the side plate part 332 of the housing case 33. The protrusion of the side plate part 332 fits into the through-hole of the side plate part 341, and thus the first coupling member 34 supports the side part of the housing case 33. In this manner, the first frame 105, the first coupling member 34, and the housing case 33 are integrally fixed to each other.

The second frame 110 has a T-shaped cross section. Specifically, the second frame 110 includes a plate part 111 and a leg part 112. The plate part 111 and the leg part 112 are integrated and made of, for example, resin. The plate part 111 extends along the back surface 2a of the cover glass 2. The plate part 111 is fixed to the back surface 2a of the cover glass 2 by the double-sided adhesive tape 100.

An end part 111a of the plate part 111 on the X2 side is disposed to overlap the front plate part 442 of the second coupling member 44. The elastic buffer material 101 is disposed between the end part 111a and the front surface 32b of the backlight 42. In other words, the buffer material 101 is provided on the front side (Z1 side) of the front plate part 442, and the LCD panel 41 and the end part 111a of the plate part 111 are provided on the front side (Z1 side) of the buffer material 101.

The leg part 112 extends annularly along the side of the backlight 32. The leg part 112 extends from the back surface of the plate part 111 to the Z2 side and supports the side part of the second display unit 4. Specifically, a protrusion (not illustrated) is provided at the side plate part 441 of the second coupling member 44 illustrated in FIGS. 7 and 8, and a through-hole (not illustrated) is provided at the leg part 112 of the second frame 110. The protrusion of the side plate part 441 fits into the through-hole of the leg part 112, and thus the leg part 112 of the second frame 110 supports the side part of the second display unit 4. In addition, another through-hole is provided at the side plate part 441 of the second coupling member 44 illustrated in FIGS. 7 and 8, and another protrusion (not illustrated) is provided at the side plate part 432 of the housing case 43. The protrusion of the side plate part 432 fits into the through-hole of the side plate part 441, and thus the second coupling member 44 supports the side part of the housing case 43. In this manner, the second frame 110, the second coupling member 44, and the housing case 43 are integrally fixed to each other. An end edge 106b of the plate part 106 of the first frame 105 and an end edge 111b of the plate part 111 of the second frame 110 are separated from each other in the X direction. In other words, the end edge 106b and the end edge 111b are opposite to each other in the X direction with a gap therebetween.

According to the second embodiment described above, advantages described below are obtained. The display device 1A includes the cover glass (front surface panel) 2, a plurality of display units disposed on the back of the cover glass 2 and disposed at different positions, the first frame 105 fixed to the back surface 2a of the cover glass 2 and supporting the side part of the first display unit 3 among the plurality of display units, and the second frame 110 fixed to the back surface 2a of the cover glass 2, supporting the side part of the second display unit 4 adjacent to the first display unit 3, and provided separately from the first frame 105.

Thus, such an advantage is obtained that the display device 1A can be more easily assembled than in the first embodiment while the relative position of the first display unit 3 with respect to the cover glass 2 and the relative position of the second display unit 4 with respect to the cover glass 2 are appropriately held. This advantage will be briefly described below.

As a premise, both the relative position of the first display unit 3 with respect to the cover glass 2 and the relative position of the second display unit 4 with respect to the cover glass 2 need to be set to appropriate positions.

First, in a case of the first embodiment, the main frame 5 is attached to the first display unit 3 and the cover glass 2 after the relative position of first display unit 3 with respect to the cover glass 2 is attached appropriately.

Subsequently, the second display unit 4 is assembled to the main frame 5. When the variation amount of shaping dimensions of the main frame 5 is larger than a predetermined amount, the error of the relative position of the second display unit 4 with respect to the cover glass 2 exceeds an allowable amount in some cases. In such a case, work is required to remove the cover glass 2 from the first display unit 3, correct the position of the first display unit 3, and then attach the first display unit 3 to the cover glass 2.

On the other hand, in a case of the second embodiment, the relative position of the first display unit 3 with respect to the cover glass 2 is corrected first, and then the first frame 105 is attached to the first display unit 3.

Subsequently, the relative position of the second display unit 4 with respect to the cover glass 2 is corrected, and then the second frame 110 is attached to the second display unit 4.

In this manner, in the second embodiment, the first frame 105 and the second frame 110 are individually assembled to the first display unit 3 and the second display unit 4, respectively. Thus, the relative position of the first display unit 3 with respect to the cover glass 2 and the relative position of the second display unit 4 with respect to the cover glass 2 can be easily set to appropriate positions.

The first display unit 3 includes the LCD panel (display panel) 31 fixed to the back surface 2a of the cover glass 2, the backlight 32 disposed on the back of the LCD panel 31 and configured to illuminate the LCD panel 31, the housing case 33 housing therein the backlight 32, and the first coupling member 34 coupling the housing case 33 and the first frame 105 to each other. In this manner, the housing case 33 housing therein the backlight 32 is coupled to the main frame 5 by the first coupling member 34. The first frame 105 is fixed to the cover glass 2. Therefore, the backlight 32, the housing case 33, the first coupling member 34, and the cover glass 2 are united by the first frame 105, and thus the display device 1A can be compactly assembled with a simple configuration.

The second display unit 4 includes the LCD panel (display panel) 41 fixed to the back surface 2a of the cover glass 2, the backlight 42 disposed on the back of the LCD panel 41 and configured to illuminate the LCD panel 41, the housing case 43 housing therein the backlight 42, and the second coupling member 44 coupling the housing case 43 and the second frame 110 to each other. The second frame 110 is fixed to the cover glass 2. Therefore, the backlight 42, the housing case 43, the second coupling member 44, and the cover glass 2 are united by the second frame 110, and thus the display device 1A can be compactly assembled with a simple configuration.

Third Embodiment

A display device 1B according to a third embodiment will be described below. Any portion having the same configuration as that of the display device 1 according to the first embodiment described above is denoted by the same reference sign and description thereof is omitted. Specifically, a frame of the display device 1B of the third embodiment is different from that of the display device 1 of the first embodiment and thus will be described below in detail.

Figure 9:
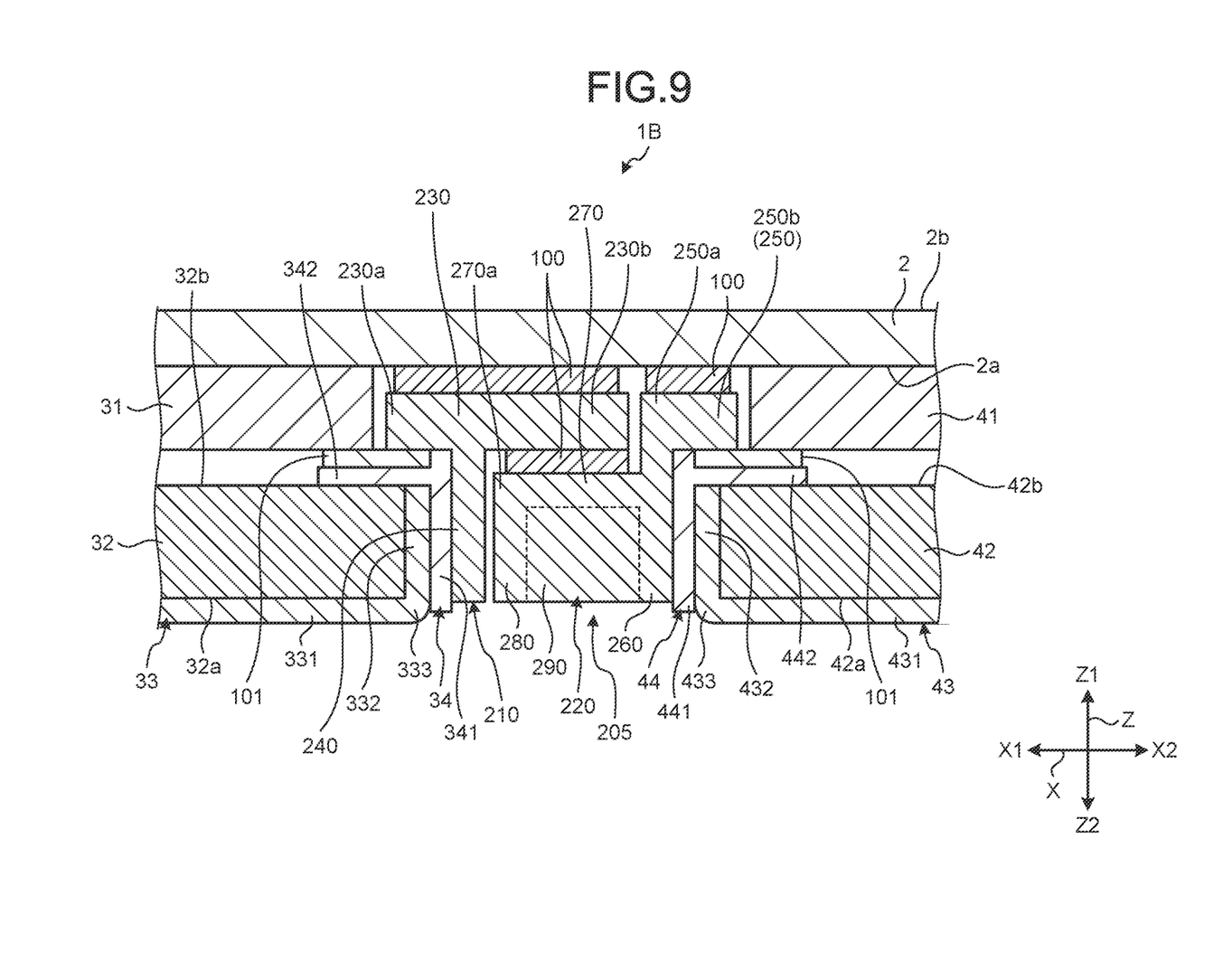
FIG. 9 is a cross-sectional view of a display device according to a third embodiment and is a diagram corresponding to FIG. 5 according to the first embodiment.
Figure 10:
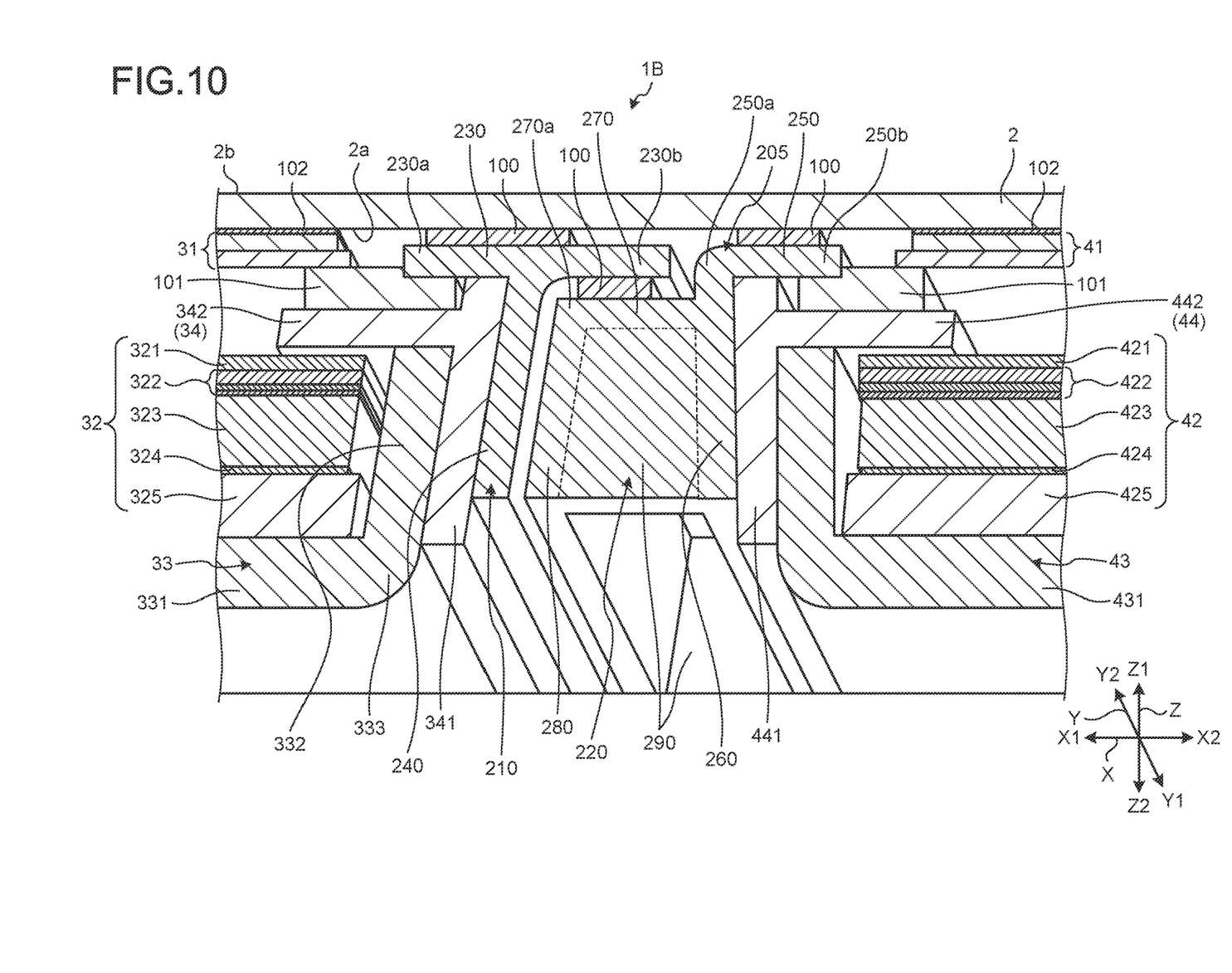
FIG. 10 is an oblique view of the cross-sectional view in FIG. 9.

FIG. 9 is a cross-sectional view of the display device according to the third embodiment and is a diagram corresponding to FIG. 5 according to the first embodiment. FIG. 10 is an oblique view of the cross-sectional view in FIG. 9.

As illustrated in FIGS. 9 and 10, a main frame 205 according to the third embodiment includes a first subframe 210 and a second subframe 220. The first subframe 210 and the second subframe 220 are integrally fixed to each other by the double-sided adhesive tape 100.

The first subframe 210 has a T-shaped cross section. Specifically, the first subframe 210 includes a first plate part 230 and a first leg part 240. The first plate part 230 and the first leg part 240 are integrated and made of, for example, resin. The first plate part 230 extends along the back surface 2a of the cover glass 2. The first plate part 230 is fixed to the back surface 2a of the cover glass 2 by the double-sided adhesive tape 100.

An end part 230a of the first plate part 230 on the X1 side is disposed to overlap the front plate part 342 of the first coupling member 34 when viewed in the Z direction. The elastic buffer material 101 is disposed between the end part 230a and the front surface 32b of the backlight 32. In other words, the buffer material 101 is provided on the front side (Z1 side) of the front plate part 342, and the LCD panel 31 and the end part 230a of the first plate part 230 are provided on the front side (Z1 side) of the buffer material 101.

The first leg part 240 extends annularly along the side of the backlight 32. The first leg part 240 extends from the back surface of the first plate part 230 to the Z2 side and supports the side part of the first display unit 3. Specifically, a protrusion (not illustrated) is provided at the side plate part 341 of the first coupling member 34 illustrated in FIGS. 9 and 10, and a through-hole (not illustrated) is provided at the first leg part 240 of the first subframe 210. The protrusion of the side plate part 341 fits into the through-hole of the first leg part 240, and thus the first leg part 240 of the first subframe 210 supports the side part of the first display unit 3. In addition, another through-hole is provided at the side plate part 341 of the first coupling member 34 illustrated in FIGS. 9 and 10, and a protrusion (not illustrated) is provided at the side plate part 332 of the housing case 33. The protrusion of the side plate part 332 fits into the through-hole of the side plate part 341, and thus the first coupling member 34 supports the side part of the housing case 33. In this manner, the first subframe 210, the first coupling member 34, and the housing case 33 are integrally fixed to each other.

The second subframe 220 has a cross-sectional shape of combined two "L" figures. Specifically, the second subframe 220 includes a second plate part 250, a second leg part 260, a third plate part 270, a third leg part 280, and a fourth plate part 290. The second plate part 250 and the second leg part 260 form an L-shaped cross section, and the third plate part 270 and the third leg part 280 form an L-shaped cross section. The second plate part 250, the second leg part 260, the third plate part 270, the third leg part 280, and the fourth plate part 290 are integrated.

The second plate part 250 and the second leg part 260 have an L-shaped cross section in combination. The second plate part 250 extends along the back surface 2a of the cover glass 2. The second plate part 250 is fixed to the back surface 2a of the cover glass 2 by the double-sided adhesive tape 100. An end part 250b of the second plate part 250 on the X2 side is disposed to overlap the front plate part 442 of the second coupling member 44. The elastic buffer material 101 is disposed between the end part 250b and the front surface 42b of the backlight 42. In other words, the buffer material 101 is provided on the front side (Z1 side) of the front plate part 442, and the LCD panel 41 and the end part 250b of the second plate part 250 are provided on the front side (Z1 side) of the buffer material 101.

The second leg part 260 extends annularly along the side of the backlight 42. The second leg part 260 extends from the back surface of the second plate part 250 to the Z2 side and supports the side part of the second display unit 4. Specifically, a protrusion (not illustrated) is provided at the side plate part 441 of the second coupling member 44 illustrated in FIGS. 9 and 10, and a through-hole (not illustrated) is provided at the second leg part 260 of the second subframe 220. The protrusion of the side plate part 441 fits into the through-hole of the second leg part 260, and thus the second leg part 260 of the second subframe 220 supports the side part of the second display unit 4. In addition, another through-hole is provided at the side plate part 441 of the second coupling member 44 illustrated in FIGS. 9 and 10, and another protrusion (not illustrated) is provided at the side plate part 432 of the housing case 43.

The protrusion of the side plate part 432 fits into the through-hole of the side plate part 441, and thus the second coupling member 44 supports the side part of the housing case 43. In this manner, the second subframe 220, the second coupling member 44, and the housing case 43 are integrally fixed to each other.

The third plate part 270 extends from a central part of the second leg part 260 in the Z direction to the X1 side. In other words, the third plate part 270 extends from the second leg part 260 along the back surface of the first plate part 230. The third plate part 270 is fixed to the back surface of an end part 230b of the first plate part 230 by the double-sided adhesive tape 100. Thus, the end part 230b of the first plate part 230 on the X2 side is opposite to the third plate part 270 in the Z direction, and the end part 230b and the third plate part 270 are bonded to each other by the double-sided adhesive tape 100.

The third leg part 280 extends from an end part 270a of the third plate part 270 on the X1 side to the Z2 side. In other words, the third leg part 280 extends from the third plate part 270 along the first leg part 240 of the first subframe 210. The third plate part 270 and the third leg part 280 have an L-shaped cross section in combination.

The fourth plate part 290 has a rectangular shape and extends so as to be orthogonal to (intersect) the third plate part 270. The fourth plate part 290 couples the second leg part 260, the third plate part 270, and the third leg part 280. The fourth plate part 290 also extends so as to be orthogonal to (intersect) the second leg part 260 and the third leg part 280. A plurality of the fourth plate parts 290 are provided at intervals in a Y direction as illustrated in FIG. 10.

According to the third embodiment described above, advantages described below are obtained. The main frame 205 includes the first subframe 210 and the second subframe 220 fixed to the first subframe 210, the first subframe 210 supports the side part of the first display unit 3, and the second subframe 220 supports the side part of the second display unit 4. With this configuration, the second subframe 220 can be fixed to the first subframe 210 in a state where the position of the second subframe 220 with respect to the first subframe 210 is changed as appropriate. Thus, the relative position of the first display unit 3 with respect to the cover glass 2 and the relative position of the second display unit 4 with respect to the cover glass 2 can be easily set to appropriate positions.

The first subframe 210 includes the first plate part 230 fixed to the back surface of the cover glass 2, and the first leg part 240 extending from the first plate part 230 along the side part of the first display unit 3 and supporting the side part. The second subframe 220 includes the second plate part 250 fixed to the back surface 2a of the cover glass 2, the second leg part 260 extending from the second plate part 250 along the side part of the second display unit 4 and supporting the side part, and the third plate part 270 extending from the second leg part 260 along the back surface of the first plate part 230 and fixed to the back surface.

Thus, the cover glass 2 can be supported from the back by the first leg part 240 and the second leg part 260. Moreover, in order to fix the third plate part 270 to the back surface of the first plate part 230, the first subframe 210 and the second subframe 220 can be fixed in a state where the relative positions of the first subframe 210 and the second subframe 220 are appropriately adjusted.

The second subframe 220 includes the third leg part 280 extending from the third plate part 270 along the first leg part 240. Thus, the first plate part 230 of the first subframe 210 can be supported by the third leg part 280.

The second subframe 220 includes the fourth plate part 290 extending so as to be orthogonal to (intersect) the third plate part 270 and coupling the second leg part 260, the third plate part 270, and the third leg part 280 to one another, whereby stiffness of the second leg part 260, the third plate part 270, and the third leg part 280 improves.

Preferable embodiments of the present disclosure are described above, but the present disclosure is not limited to such embodiments. Contents disclosed in the embodiments are merely exemplary, and various kinds of modifications are possible without departing from the scope of the present disclosure. Any modification performed as appropriate without departing from the scope of the present disclosure belongs to the technical scope of the present disclosure. At least one of various kinds of omission, replacement, and change of components can be performed without departing from the scope of the embodiments and modification described above. For example, the number of display regions is set to be two in the embodiments, but may be three or more. A bonding agent may be used instead of the double-sided adhesive tape 100 used for bonding of the cover glass 2 and the main frame 5, bonding of the cover glass 2 and each of the first frame 105 and the second frame 110, bonding of the cover glass 2 and each of the first subframe 210 and the second subframe 220.

What is claimed is:

1. A display device comprising:
   a front surface panel;
   a plurality of the display panels disposed at different positions on a back of the front surface panel, the display panels including a first display panel and a second display panel; and
   a main frame supporting side parts of the first display panel and the second display panel that are adjacent to each other, and that are fixed to a back surface of the front surface panel, wherein
   the main frame includes:
      a first subframe supporting a side part of the first display panel; and
      a second subframe fixed to the first subframe and supporting a side part of the second display panel,
   the first subframe includes:
      a first plate part fixed to the back surface of the front surface panel; and
      a first leg part extending from the first plate part along the side part of the first display panel and supporting the side part, and
   the second subframe includes:
      a second plate part fixed to the back surface of the front surface panel;
      a second leg part extending from the second plate part along the side part of the second display panel and supporting the side part; and
      a third plate part extending from the second leg part along a back surface of the first plate part and fixed to the back surface of the first plate part.

2. The display device according to claim 1, wherein the second subframe includes a third leg part extending from the third plate part along the first leg part.

3. The display device according to claim 2, wherein the second subframe includes a fourth plate part extending so as to intersect the third plate part and coupling the second leg part, the third plate part, and the third leg part.

4. The display device according to claim 1, further comprising:
   a first backlight disposed on a back of the first display panel,
   a first housing case housing therein the first backlight, and
   a first coupling member coupling the first housing case and the first subframe to each other.

5. The display device according to claim 4, wherein
   the first coupling member includes a fifth plate part extending along the front surface panel to a position overlapping the first backlight, and
   the first backlight is sandwiched between the fifth plate part and the first housing case.

6. The display device according to claim 1, further comprising:
   a second backlight disposed on a back of the second display panel,
   a second housing case housing therein the second backlight, and
   a second coupling member coupling the second housing case and the second subframe to each other.

7. The display device according to claim 6, wherein
   the second coupling member includes a sixth plate part extending along the front surface panel to a position overlapping the second backlight, and
   the backlight is sandwiched between the sixth plate part and the second housing case.

8. A display device comprising:
   a front surface panel;
   a plurality of the display panels disposed at different positions on a back surface of the front surface panel, the display panels including a first display panel and a second display panel;
   a first frame fixed to the back surface of the front surface panel and supporting a side part of the first display panel; and
   a second frame fixed to the back surface of the front surface panel, supporting a side part of the second display panel adjacent to the first display panel, and provided separately from the first frame, wherein
   a first backlight is disposed on a back of the first display panel;
   a first housing case houses therein the first backlight; and
   a first coupling member couples the first housing case and the first frame to each other,
   the first coupling member includes a fifth plate part extending along the front surface panel to a position overlapping the first backlight, and
   the first backlight is sandwiched between the fifth plate part and the first housing case.

9. The display device according to claim 8, wherein
   a second backlight is disposed on a back of the second display panel,
   a second housing case houses therein the second backlight, and
   a second coupling member couples the second housing case and the second frame to each other.

10. The display device according to claim 9, wherein
    the second coupling member includes a sixth plate part extending along the front surface panel to a position overlapping the second backlight, and
    the second backlight is sandwiched between the sixth plate part and the second housing case.

* * * * *